(12) United States Patent
Chu (10) Patent No.: US 11,599,493 B2
(45) Date of Patent: Mar. 7, 2023

(54) MULTI-HOST USB HUB AND DOCKING SYSTEM

(71) Applicant: Logitech Europe S.A.

(72) Inventor: Joseph Yao-Hua Chu, Los Gatos, CA (US)

(73) Assignee: Logitech Europe S.A., Lausanne (CH)

( * ) Notice: Subject to any disclaimer, the term of this patent is extended or adjusted under 35 U.S.C. 154(b) by 40 days.

(21) Appl. No.: 17/387,251

(22) Filed: Jul. 28, 2021

(65) Prior Publication Data

US 2023/0035480 A1 Feb. 2, 2023

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/0042* (2013.01)

(58) Field of Classification Search
CPC .................................................. G05B 13/028
See application file for complete search history.

(56) References Cited

U.S. PATENT DOCUMENTS 8,266,363 B2 * 9/2012 Chou ...................... G06F 3/023
710/316

* cited by examiner

*Primary Examiner* — Henry Tsai
*Assistant Examiner* — Juanito C Borromeo
(74) *Attorney, Agent, or Firm* — Kilpatrick Townsend & Stockton LLP (57) ABSTRACT

A dual-host, USB system comprising a USB hub, a multiplexor (MUX) configured to couple a first host computing device or a second host computing device to a USB hub where each of the first and second host computing device have host-level control of a plurality of USB ports coupled to the USB hub based on which of a first or second input of the MUX is selected. The system further includes a processor communicatively coupled to the second host computing device and the USB hub, the processor providing a non-USB communication path from the second host computing device to the first host computing device to facilitate the sending of commands from the second host computing device to the first host computing device in the USB system.

20 Claims, 8 Drawing Sheets

MULTI-HOST USB HUB AND DOCKING SYSTEM

BACKGROUND

A USB hub can be a device that expands a single Universal Serial Bus (USB) port into several so that there are more ports available to connect devices to a host system, similar to the operation of a power strip with multiple receptacles. The devices connected through a USB hub typically share the bandwidth available to that hub. USB hubs are conventionally included in computer cases, keyboards, or other computer peripheral device, and those with many USB ports often draw from one or two internal USB ports rather than each port having independent USB circuitry.

USB hubs can have a variety of form factors including external boxes (e.g., similar to an Ethernet or network hub) and small boards that can couple directly into a USB port. In some cases, mobile devices (e.g., laptop computers) can be equipped with USB ports, but an external USB hub can consolidate many devices onto a single hub for more convenient access. Some USB hubs may support power delivery (PD) and charging, and in some cases can be referred to as a docking station.

Despite the advantages that USB hubs and docking stations can provide, there are a number of drawbacks with conventional USB hubs that limit their applicable use. Functional improvements in this space are needed.

It should be noted that unless otherwise indicated herein, the materials described in this section are not prior art to the claims in this application and are not admitted to be prior art by inclusion in this section.

BRIEF SUMMARY

According to certain embodiments, a dual-host, universal serial bus (USB) system includes a USB hub including a plurality of USB ports; a multiplexor (MUX) including: a first input; a second input; and an output coupled to the USB hub, wherein the MUX is configured to electrically couple the first input to the output when the MUX is switched to a first mode of operation, and the MUX is configured to electrically couple the second input to the output when the MUX is switched to a second mode of operation; a host port coupled to the first input of the MUX, the host port operable to receive a first host computing device, the host port providing host-level control of the USB hub to the first host computing device when the MUX is in the first mode of operation; a second host computing device coupled to the second input of the MUX, the second host computing device having host-level control of the USB hub when the MUX is in the second mode of operation; and a microcontroller unit (MCU) communicatively coupled to the second host computing device and the USB hub, the MCU providing a non-USB communication path from the second host computing device to the first host computing device to facilitate the sending of commands from the second host computing device to the first host computing device when the MUX is in the first mode of operation. The host port can be a computer docking station and the first host computing device can be a mobile computing device (e.g. PC laptop, netbook, smart device, tablet computer, etc.). In some aspects, the second host computing device (e.g., Android® device) includes: a display device; and an integrated circuit configured to control the display device, the display device having a graphical user interface (GUI) operable to receive inputs from a user (e.g., a tablet computer). The non-USB communication path can be a sideband channel, and wherein the commands sent from the second host computing device to the first host computing device can include human interface device (HID) commands. The second host computing device can control the switching of the MUX between the first mode of operation and the second mode of operation. The second host computing device may be communicatively coupled to an external computing system via a cloud-based internet connection, the external computing system having administrative control over the operation of the system. The external computing system may be configured to control the switching of the MUX between the first mode of operation and the second mode of operation.

In some embodiments, a method for operating a dual-host USB system includes: receiving a control signal configured to cause a multiplexor (MUX) to switch between a first mode of operation and second mode of operation, the MUX including: a first input coupled to a host port that is operable to receive a first host computing device; a second input coupled to a second host computing device; and an output coupled to a USB hub having a plurality of USB ports; switching the first input to the output of the MUX in response to the MUX being switched to the first mode of operation, wherein when in the first mode of operation the host port provides the first computing device host-level control of the USB hub; switching the second input to the output of the MUX in response to the MUX being switched to the second mode of operation, wherein when in the second mode of operation the second host computing device has host-level control of the USB hub; and sending a command from the second host computing device to the first host computing device via an MCU over a non-USB communication path when the MUX is in the first mode of operation. The host port can be a computer docking station and the first host computing device can be a mobile computing device (e.g., PC laptop, netbook, tablet computer, smart device, etc.). The second host computing device may include a display device and an integrated circuit configured to control the display device, the display device having a graphical user interface (GUI) operable to receive inputs from a user, the second host computing device configured to generate the commands based on the received inputs from the user. The non-USB communication path may be a sideband channel, and the commands sent from the second host computing device to the first host computing device can include human interface device (HID) commands. The second host computing device may control the switching of the MUX between the first mode of operation and the second mode of operation. The second host computing device is communicatively coupled to an external computing system via a cloud-based internet connection, the external computing system having administrative control over the operation of the system. The external computing system may control the switching of the MUX between the first mode of operation and the second mode of operation.

In further embodiments, a system comprises: one or more processors; one or more machine-readable, non-transitory storage mediums that include instructions configured to cause the one or more processors to perform operations including: receiving a control signal configured to cause a multiplexor (MUX) to switch between a first mode of operation and second mode of operation, the MUX including: a first input coupled to a host port that is operable to receive a first host computing device; a second input coupled to a second host computing device; and an output coupled to a USB hub having a plurality of USB ports; switching the first input to the output of the MUX in response to the MUX being switched to the first mode of operation, wherein when in the first mode of operation the host port provides the first computing device host-level control of the USB hub; switching the second input to the output of the MUX in response to the MUX being switched to the second mode of operation, wherein when in the second mode of operation the second host computing device has host-level control of the USB hub; and sending a command from the second host computing device to the first host computing device via an MCU over a non-USB communication path when the MUX is in the first mode of operation. In some aspects, the host port is a computer docking station and the first host computing device is a mobile computing device. The second host computing device includes: a display device; and an integrated circuit configured to control the display device, the display device having a graphical user interface (GUI) operable to receive inputs from a user, the second host computing device configured to generate the commands based on the received inputs from the user. The non-USB communication path can be a sideband channel, and the commands sent from the second host computing device to the first host computing device include human interface device (HID) commands. The second host computing device may control the switching of the MUX between the first mode of operation and the second mode of operation. The second host computing device may be communicatively coupled to an external computing system via a cloud-based internet connection, the external computing system having administrative control over the operation of the system.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Aspects of the present disclosure relate generally to computing device, and more particularly to multi-host controlled USB hub and docking systems, according to certain embodiments.

In the following description, various examples of multi-host controlled USB hub and docking systems are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to multi-host controlled USB hub and docking system. A typical USB hub system has one upstream port and a number of downstream ports. The upstream port typically connects the USB hub(s) and/or USB devices to a single host computing device (the "host"). Conventionally, the USB communication protocol does not accommodate for multiple hosts in a USB connected system. However, certain aspects of the invention allow multiple hosts to operate within single USB communication network due to a novel system architecture and communication methodology (see, e.g., FIG. 4).

In some USB systems, under normal data transmission conditions hubs can be operationally transparent, where data received from the hub's upstream port (e.g., the host computing device) is broadcast to all devices attached to its downstream ports (e.g., keyboard, mouse, speaker, webcam, other computer peripheral devices, or the like) and data received from a downstream port (e.g., the peripheral devices) is generally forwarded to only the upstream port (e.g., the host computing device). Thus, in earlier USB standards, what is sent by the host computing device may be received by all hubs and devices, and what is sent by a downstream device is received by the host but not by the other devices. USB 3.0 utilizes "point-to-point" routing where a route string sent in the packet header allows a USB 3.0 host computing device to only send a downstream packet to a single destination port rather than all of them, thereby potentially decreasing data traffic congestion and power consumption.

As noted above, conventional USB systems are configured to have a single host and any number of USB hubs and/or devices downstream, such as with a mobile computer docking system. In some scenarios, it would be advantageous to allow two or more hosts. For instance, some embodiments described herein can include a second host device to access the USB system (e.g., via a cloud service) to facilitate a device management infrastructure, such that for instance an IT manager could remotely administer any number of workstations in a network without having to be physically present to plug in their laptop to configure each station, as is currently the case in many conventional office settings. The second host device may poll the various USB devices and identify what they are and their corresponding status (e.g., their firmware version, errors, presence, etc.). This allows the IT manager to remotely update devices, debug devices, or know if someone removed a device such as a mouse, etc., from the USB hub system. In some embodiments, the second host computing device may have control to disconnect the first host computing device (e.g., user's personal computer) and take control of the devices for administrative and/or maintenance purposes.

Figure 2:
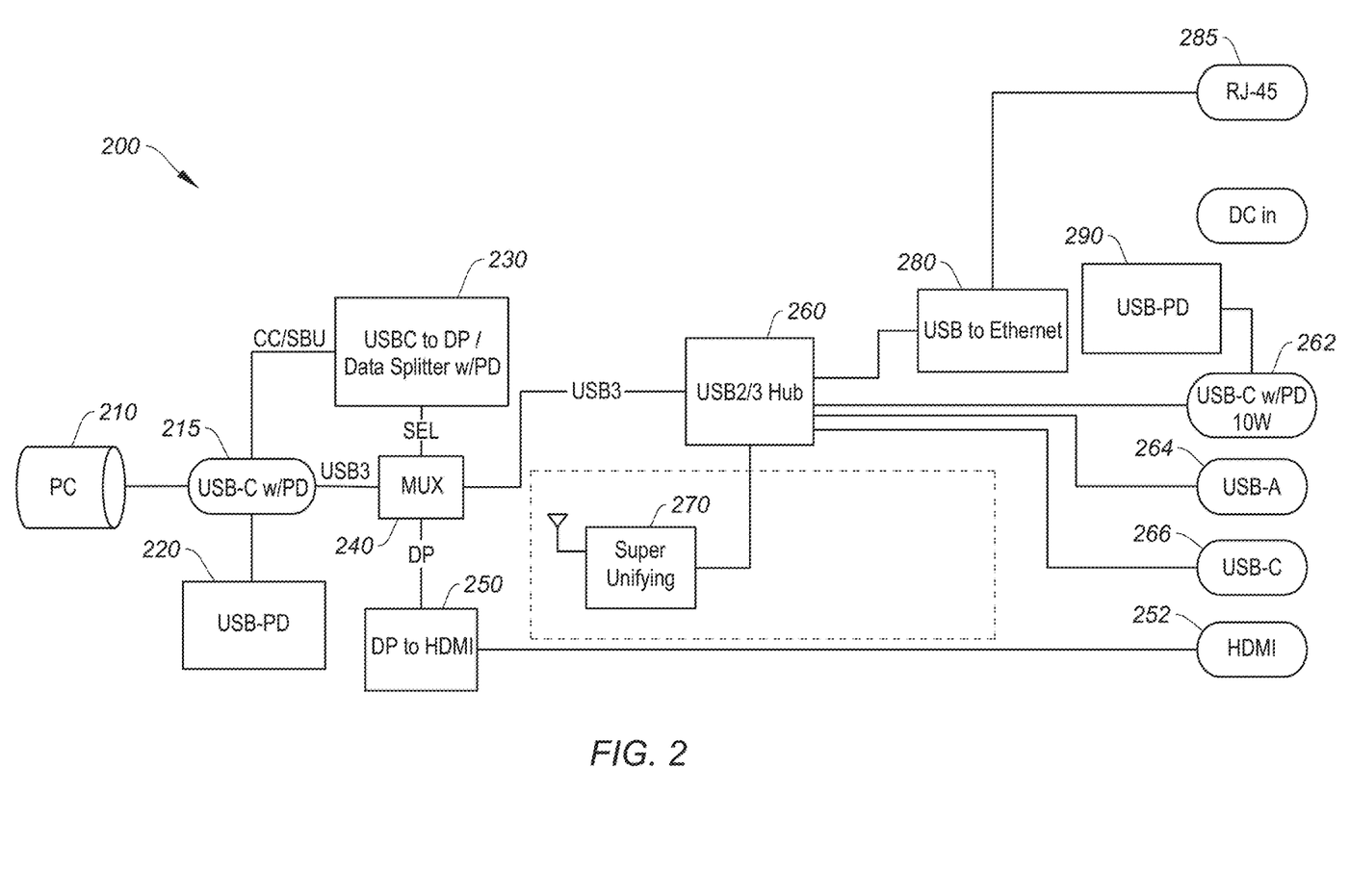
FIG. 2 shows a block diagram of a USB hub and docking system.
Figure 3:
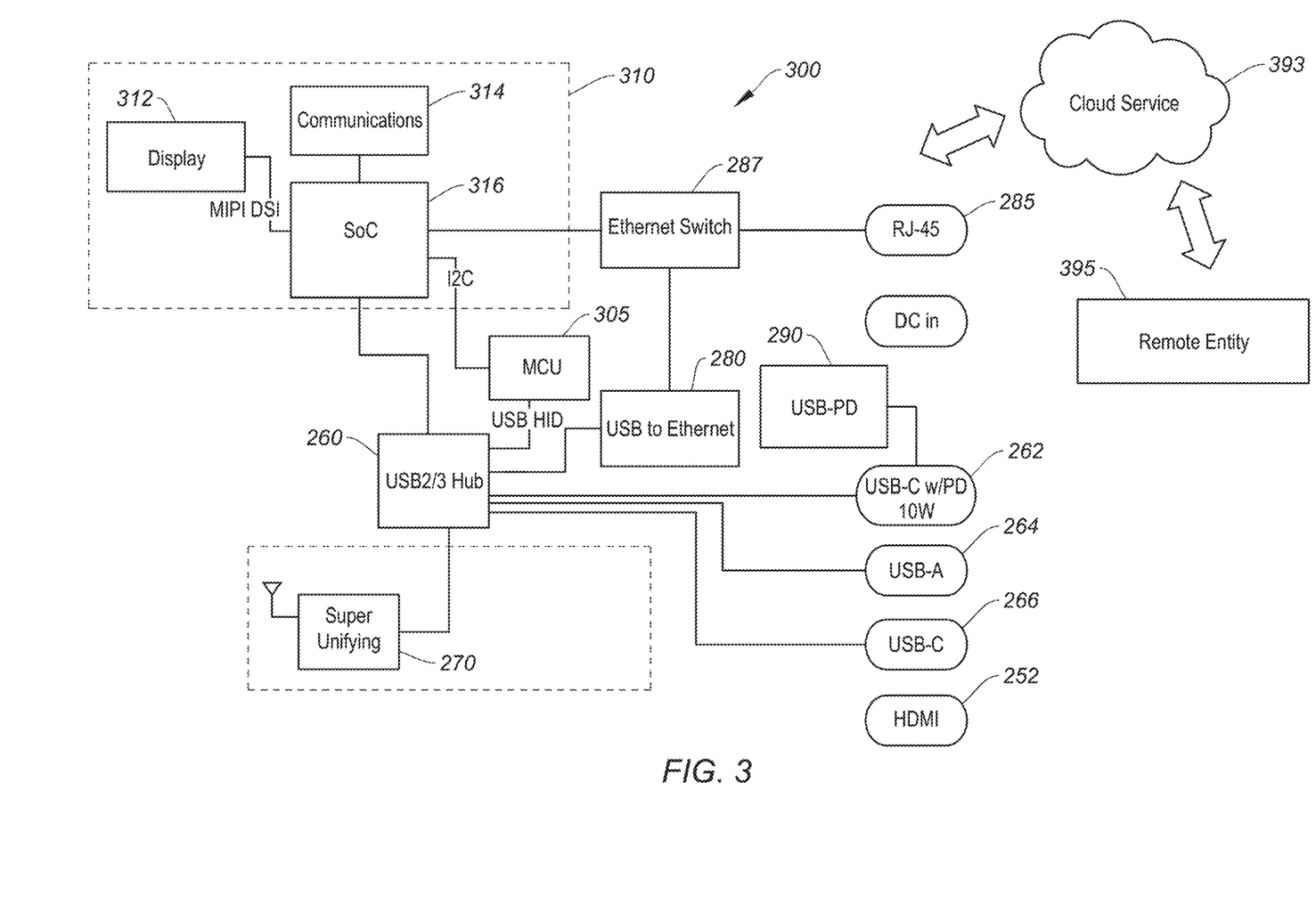
FIG. 3 shows a block diagram of aspects of a USB hub and docking system, according to certain embodiments.
Figure 4:
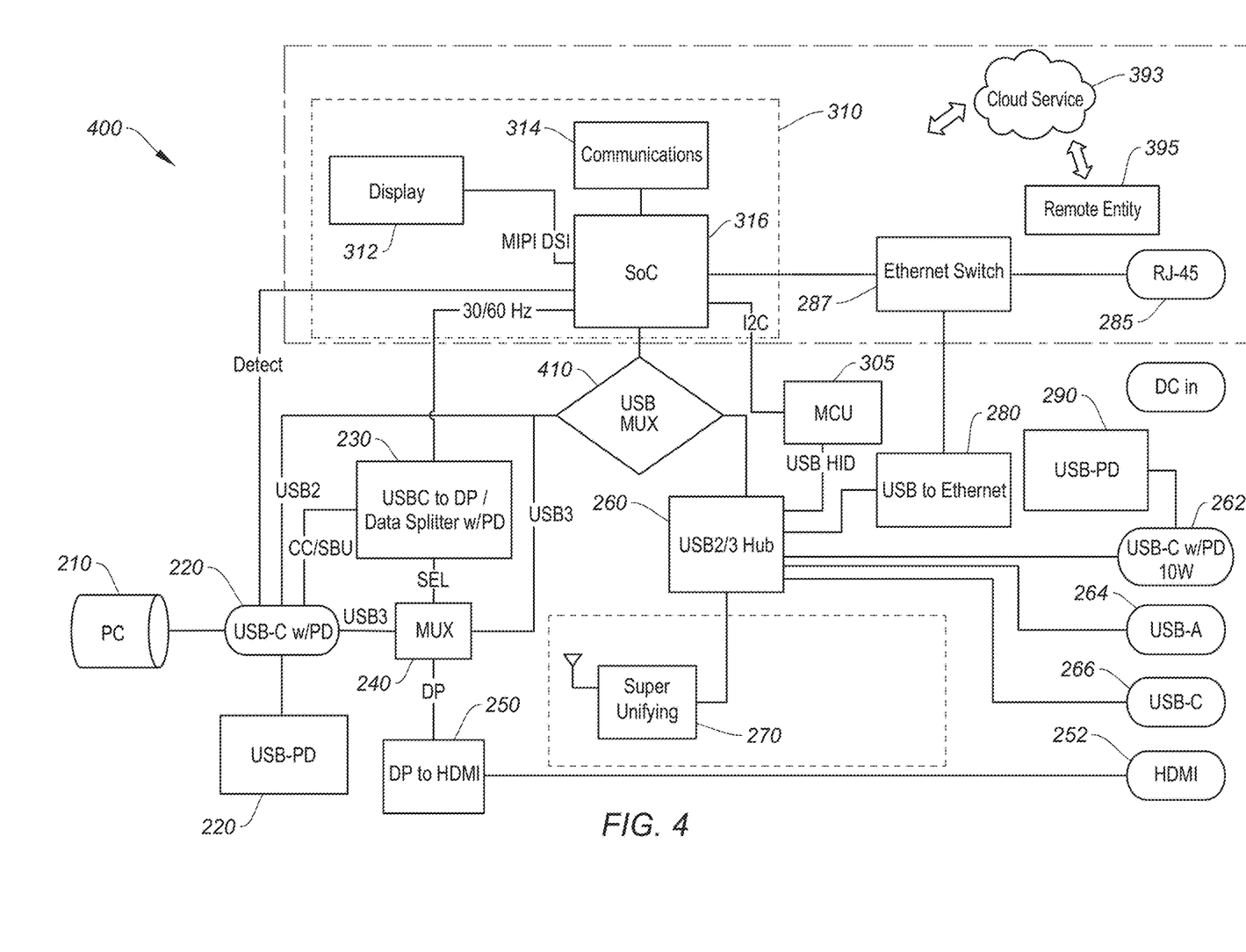
FIG. 4 shows a block diagram of a USB hub and docking system with multi-host control, according to certain embodiments.

The following embodiments present various implementations of a multi-host USB system, as shown for example in FIG. 4. FIG. 2 shows a portion of a multi-host USB system configured to operate as a USB hub and docking system for a first host computing device (e.g., a laptop computer) when a multiplexor (MUX) is configured in a first mode of operation (e.g., configured to receive and pass data from the first host computing device to the USB hub). FIG. 3 shows a portion of the multi-host USB system configured to operate as a USB hub for a second host computing device (e.g., a tablet computer) when the MUX is configured in a second mode of operation (e.g., configured to receive and pass data from the second host computing device to the USB hub). The second host computing device may be remotely controlled via a cloud-based (e.g., Ethernet) connection for administrative management, as further described below. FIGS. 4-8 show how the second host computing device can communicate and interface with the first host computing device through the USB Hub and MUX via an alternative communication channel via an additional processor (e.g., micro-controller unit), according to certain embodiments. These concepts and more are further described in the figures and description that follow.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

Figure 1:
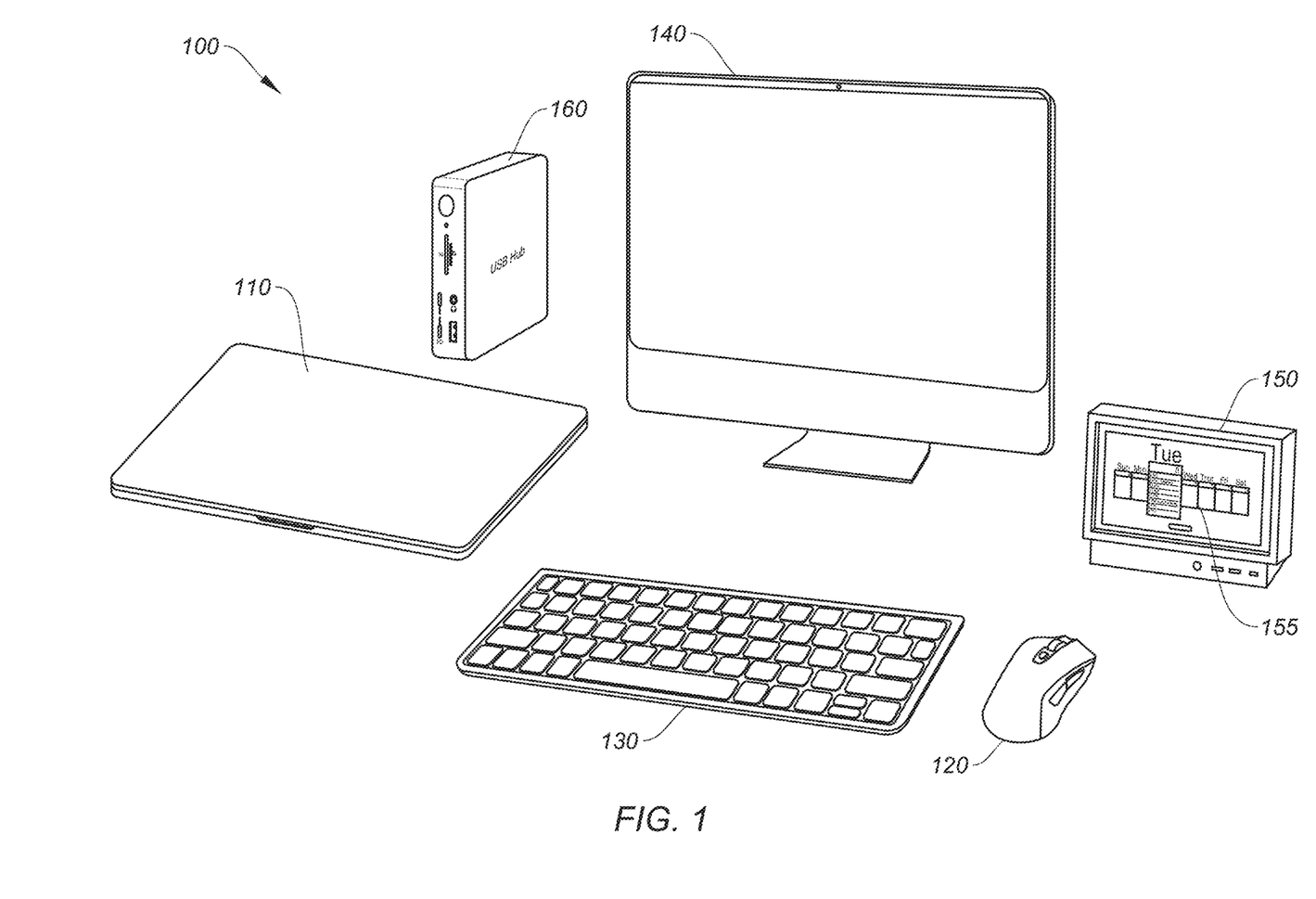
FIG. 1 shows a workstation that can be coupled to a multi-host USB hub and docking system, according to certain embodiments.

FIG. 1 shows a workstation that can be coupled to a multi-host USB hub and docking system 100, according to certain embodiments. System 100 can include host computing device 110 that can be communicatively coupled (e.g., wired or wireless coupling) to a plurality of peripheral computer devices 120-140 via USB hub 160. Host computer 110 may include any suitable computing device, such as a desktop computer, laptop computer (as shown), tablet computer, netbook, smart device, or other suitable computing device. System 100 can further include a second host computer 150 with display 155 that can also be communicatively coupled (e.g., wired or wireless coupling) to peripheral computer devices 120-140 via USB hub 160. USB hub 160 can be a standalone USB hub or, in some cases, can be integrated with a docking station to receive host computer 110. Peripheral devices 120-140 can be any suitable computer peripheral device, however the examples shown here are typically found in conventional systems configured for office or home use. For instance, peripheral device 120 may be a computer mouse, peripheral device 130 can be a keyboard, and peripheral device 140 can be a monitor or other display device. One of ordinary skill in the art with the benefit of this disclosure would appreciate the many modifications, variations, and alternative embodiments of the various communicative connections, peripheral devices, host computing devices, etc., to be included in a multi-host USB hub system, as described in the present disclosure.

FIG. 2 shows aspects of block diagram of a USB hub and docking system ("System") 200, according to certain embodiments. System 200 can be a subset of the multi-host USB hub and docking system 400, and can be configured to cause a first host computing device 210 to control the USB hub 260 when a multiplexor (shown in FIG. 4) is configured in a first mode of operation, as further described below.

System 200 may be configured to utilize a USB-C alt-mode that breaks out DisplayPort (DP) video in addition to USB data lines that go to an internal USB hub and various USB integrated circuits (ICs) communicatively coupled thereto to provide compatibility and support for various interface protocols, such as Secure Digital (SD) cards, high-definition multimedia interface (HDMI), and the like. Referring to FIG. 2, system 200 can include a USB-C interface 215 (e.g., cable, docking system, physical USB-C connector, etc.) with power delivery (PD) that may be configured to communicatively couple to a first host computing device 210 (e.g., laptop, tablet, smart phone, or other suitable host computing device) for transmission of power and data. USB-C interface 215 may be split to any number of communication protocols, as noted above, such as a USB-C to DP data splitter with DP 230 via any suitable format (e.g., CC/SBU—a configuration channel that can be used to determine plug orientation, communication device roles, power capabilities, and send Power Delivery messages). USB-C interface 215 may feed into MUX 240, which may be configured to multiplex inputs from USB-C to DP 230 data splitter with DP 230 and USB-C interface 215 and output to USB hub 260 or to DP-to-HDMI converter 250 with HDMI output 252. USB hub 260 may be further configured to receive input from other communication protocols (e.g., Logitech® Super Unifying® communication protocol). USB hub 260 can provide a number of USB input/output (I/O) ports to send and receive data from one or more peripheral computing devices. Some I/O ports may include USB-C with PD port 262 (connector with charging capability), USB-A port 264, USB-C port 266, HDMI port 252, and USB-to-Ethernet port 280, which may be communicatively coupled to a remote system (e.g., cloud-based) via any suitable connection (e.g., RJ-45 connector). In some aspects, a DC-in barrel connector may be included as an AC adaptor input. USB hub 260 may include any number of I/O ports directly coupled thereto, or may incorporate I/O ports further downstream (e.g., not directly coupled to USB hub 260), as would be appreciated by one of ordinary skill in the art with the benefit of this disclosure. Thus, system 200 can provide a USB hub 260 that can expand a single USB port (e.g., USB-C with PD cable 215) into multiple USB ports (e.g., USB-C, USB-A, etc.) so that more ports are available to communicatively couple a plurality of peripheral computing devices to a host computing device (e.g., first host computing device 210). In some embodiments, DP 230 may be an integrated circuit that communicates with a host to determine if it supports, for instance, alt-mode display outputs. In some aspects, USB-PD 220 can be USB power delivery, which is a circuit that provides actual power to charge USB-C devices.

FIG. 3 shows a block diagram of aspects of a USB hub and docking system ("System") 300, according to certain embodiments. System 300 can be another subset of the multi-host USB hub and docking system 400, and can be configured to cause a second host computing device 310 to control USB hub 260 when a multiplexor (shown in FIG. 4) is configured in a second mode of operation, as further described below. Further, a remote entity 395 may control aspects of host computing device 310 via a remote wireless connection (e.g., cloud service, etc.). This can allow, for instance, an information technology (IT) specialist to remotely control aspects of system 300 (e.g., polling and configuring peripheral devices coupled to USB hub 260). Host computing device 310 can include one or more processors (e.g., silicon-on-a-chip ("SoC") 316 or MCU), a display 312 (e.g., touchscreen user interface (UI) and user experience (UX)) communicatively coupled to SoC 316, and a communications block 314 communicatively coupled to SoC 316. Host computing device 310 (e.g., the second host) can be configured to run the display UI and directly link to cloud service 393 to facilitate remote updating and interfacing with USB devices. SoC 316 is further communicatively coupled to Ethernet switch 387, USB hub 260, and microcontroller unit ("MCU") 305. Ethernet switch 387 may operate to route data from SoC 316 or USB-to-Ethernet port 280 to remote entity 395 via a cloud service 393 or other suitable communications architecture to facilitate a communicative coupling between remote entity 395 and system 300. MCU 305 provides a non-USB-based communicative path (e.g., side-band channel) between SoC 316 and USB hub 260, as further described below for instance with respect to FIG. 4. Display 312 can be any suitable device configured to display an output (e.g., video and/or audio). In some embodiments, display 312 may include a touch-sensitive display surface and can include an audio interface (e.g., speaker(s) and microphone(s)). Communications block 314 may be configured to facilitate communications between host computing device 310 and other devices internal or external to system 300. In some aspects, communications block 314 may facilitate Bluetooth communication, Wi-Fi, ZigBee, or other suitable wireless communications protocol. Alternatively or additionally, communications block 314 may incorporate hardwired connections and a corresponding data bus system for direct communicative coupling to various elements internal to or external of system 300. System 300 may be configured such that second host computing device 310 can maintain (e.g., update, check status, configure, etc.) peripheral device plugged into the USB downstream ports (e.g., ports 262, 264, 266, etc.) when a first host computing device is not present or active. Although much of the nomenclature shown in FIGS. 2-7 would be known by one of ordinary skill in the art with the benefit of this disclosure, some abbreviations include DP—Display Port; I²C—Inter-Integrated Circuit, which is a synchronous, multi-master, multi-slave, packet switched, single-ended, serial communication bus used for attaching lower-speed peripheral ICs to processors and MCUs in short-distance, intra-board communication; CC/SBU—the configuration channel can be used to determine plug orientation, communication device roles, power capabilities, and send Power Delivery messages; and SBU—side band channel; RJ-45—Ethernet cable standard; MIPI DSI—display serial interface. In some aspects, I²C can be replaced with any suitable serial protocol (e.g., UART, SPI, etc.). Thus, in some embodiments, and as further described below, MCU 305 operates bridge between two host computers and allows a sideband communications link between SoC 316 (e.g., second host computing device) and a host PC (e.g., first host computing device), which can be used for presence updates, status updates, or to spoof a HID device to allow pass through of touchscreen inputs from the SoC display to the PC, which heretofore was not possible in USB systems.

Multi-Host Control of a USB Docking System

As described above, conventional USB systems are configured to have a single host and any number of USB hubs and/or devices downstream, such as with a mobile computer docking system. Aspects of the present invention, including the embodiments of FIGS. 4-8, can include a second host device (e.g., typically remaining at the work station) to access the USB system (e.g., via a cloud service) and facilitate an enhanced device management infrastructure. In many office settings, an IT personnel typically has to manually configure each workstation as different users and corresponding laptops are plugged into the USB docking system. For instance, IT personnel usually has to poll peripheral devices coupled to the USB hub and configure them to accommodate the user's system (e.g., laptop device, netbook, tablet computer, etc.). This often requires the IT personnel to remain on premises to configure each system in preparation for each user, which can be time consuming and inefficient.

In certain embodiments presented herein (see, e.g., FIGS. 4-8), a USB MUX is added to a USB hub system to switch between either a first host computing device (e.g., a user's laptop) or a second host computing device (e.g., a fixed computing device) to be communicatively coupled to USB hub 260 and in control of the downstream peripheral devices. In each case, one host computing device or the other controls the downstream peripheral devices at any one time. When the first computing device is switched via the USB MUX to be communicatively coupled with the USB hub (typically via a docking system), the first host computing device controls each peripheral device coupled to the USB hub. For example, a user may connect their laptop to a docking station, which gives them control of the downstream USB peripheral devices via the USB hub. When the second computing device is switched via the USB MUX to be communicatively coupled with the USB hub, the second host computing device controls each peripheral device coupled to the USB hub, rather than the first host computing device.

From an IT management standpoint, the inclusion of a cloud service and device management infrastructure to the system allows the IT personnel to remotely administer multiple workstations at once without having to physically be there to physically plug in a laptop (e.g., a second host computing device) into each individual station. For example, an IT personnel may remotely access the second host computing device and administer the system (and any number of workstations in the network) without having to be physically present to plug in their laptop to configure the USB peripheral devices, as is currently the case in many conventional office settings. The second host device may poll the various USB devices and identify what they are and their corresponding status (e.g., their firmware version, errors, presence, etc.). This may allow the IT personnel to remotely update devices, debug devices, or know if someone removed a device such as a mouse, etc., from the USB hub system. Thus, the USB MUX can be configured to flip the USB upstream port from the USB hub to be either a first host computing device (e.g., a user's laptop) or a second host computing device (e.g., a dedicated computer configured to maintain (e.g., update, check status, configure, etc.) peripheral devices plugged into the USB downstream ports when the first host computing device is not present or active. In some embodiments, the second host computing device may be configured to have primary and/or exclusive control over the USB MUX to disconnect the first host computing device (e.g., user's personal computer) and take control of the devices for administrative and/or maintenance purposes. In some embodiments, the second host computing device may switch the USB MUX when a first host computing device is docked.

In some embodiments, the functionality of the USB system with multi-host control is further enhanced by allowing the second host computing device to communicate with the first host computing device through a non-USB communication path. As noted above, multiple host computing devices are not conventionally allowed in a USB system, much less communication between multiple host computing devices as one host computing device would be seen as a peripheral device of the other host computing device, which can present many deleterious system configuration stability issues, as would be appreciated by one of ordinary skill in the art with the benefit of this disclosure. The non-USB communication path presented herein may allow commands from the second host computing device to be seen by the first host computing device as a human interface device (HID) command, as is typically associated with peripheral devices, without having to reconfigure the controlling host computing device for the USB hub and corresponding downstream peripheral devices. In some embodiments, an MCU is communicatively coupled between the second host computing device and the USB hub to receive commands from the second host computing device via a communication sideband and passes it to the first host computing device via the USB hub communication path. Thus, interactions on the second host computing device (e.g., user inputs on a touch screen or other suitable interface) may be passed to a user's laptop (first host computing device) to trigger events, etc., even when the first host computing device is coupled to the USB hub via the USB MUX, as further described in the embodiments that follow.

Thus, the embodiments of FIGS. 4-8 present a technical solution to a technical problem of having two or more hosts on the same USB bus and facilitating communication between them in an USB system architectural configuration that does not conventionally allow this to occur. To appreciate the effectiveness, stability, and efficiency of said embodiments, alternative approaches and their corresponding problems can be examined. For instance, with the absence of a MUX to couple one of the host computing devices to the USB hub with the exclusion of the other, the second host computing device would have to detect when a first host computing device is coupled to the system and thereafter configure itself in real-time from an upstream device to a downstream device under the control of the first host computing device. Real-time switching presents several challenges that may be replete with complications. For instance, the USB hub would have to intelligently and dynamically switch to physically change upstream USB ports in real time, which can have sensitive timing challenges to manage, which can be exacerbated as peripheral devices are added and removed from the USB hub. Furthermore, when the second host computing device becomes the controlling entity, the first host computing device (e.g., the port it is coupled to) would need to be disabled and a separate resource would need to detect when the first host computing device (e.g., a laptop) is connected and then swap all USB ports back to the first configuration. To add further complexity, when a first host computing device is connected, further configuration settings would have to be implemented to coordinate a display associated with the second host computing device with the first host computing device in order for inputs on the display (e.g., touch inputs, audio inputs, etc.) to be contextually relevant to the first host computing device. These handoffs between the first and second host computing devices can introduce real-time, complex changes to operating system settings and performance characteristics as the first and second host computing devices change their role from upstream host to downstream device and USB devices are connected and disconnected from the USB hub, which presents many vectors that can lead to substantial system performance problems.

With the introduction of a USB MUX 410, as described below with respect to FIG. 4, the problems described above can be avoided. The addition of an MCU 305 can further provide communication path between the first and second host computing devices without the need to change host or device upstream/downstream configurations, and in some embodiments can be used to coordinate switching between hosts.

Figure 7:
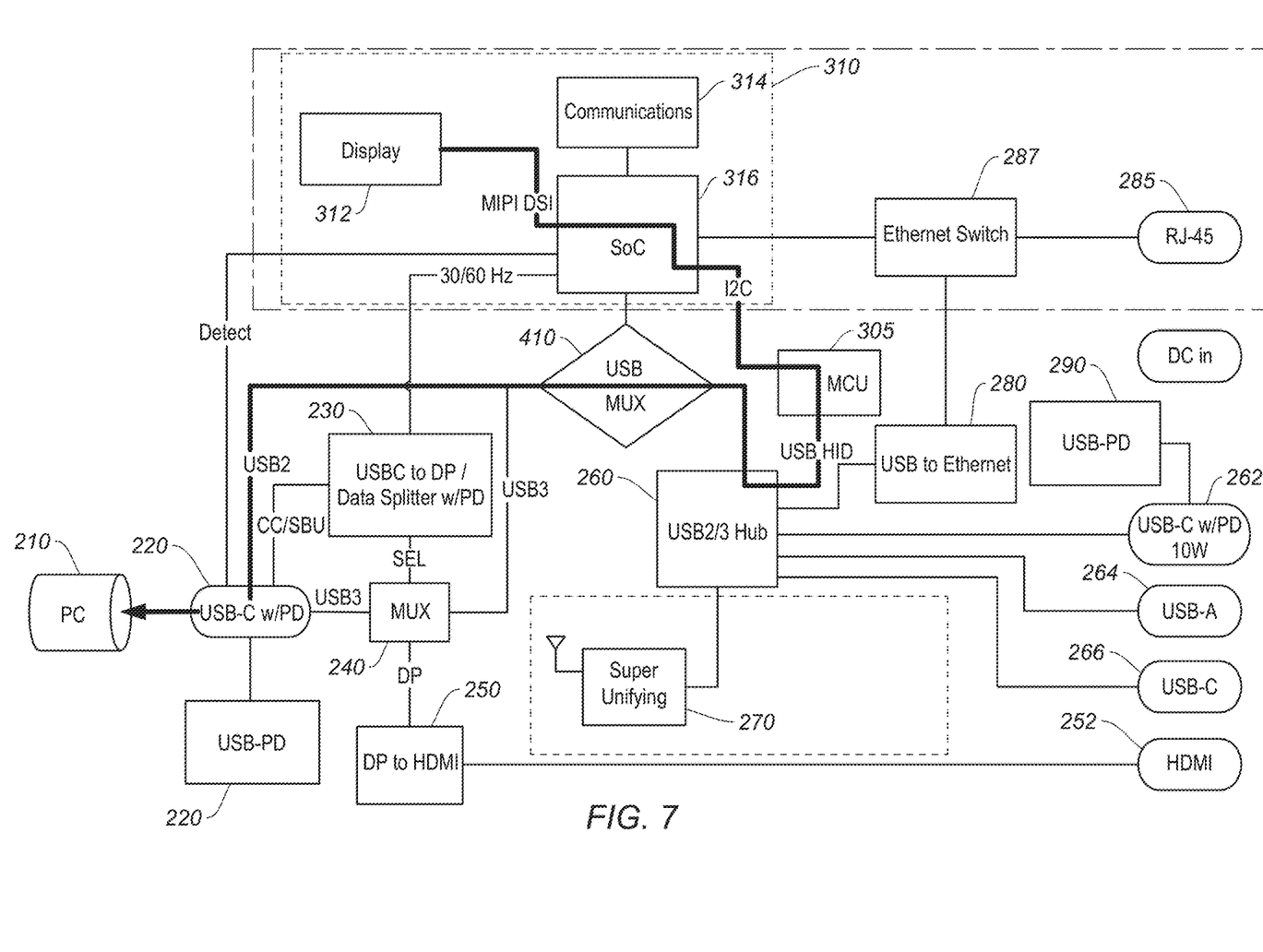
FIG. 7 shows a communication path between host devices in a USB hub and docking system with multi-host control, according to certain embodiments.

FIG. 4 shows a block diagram of a USB hub and docking system ("system") 400 with multi-host control, according to certain embodiments. System 400 can include the system elements of systems 200 and 300, with the addition of USB MUX 410 to facilitate the switching of the controlling host computing device between a first host computing device 210 and a second host computing device 310. MCU 305, coupled between SoC 316 and USB Hub 260, is configured to communicate on a serial interface with SoC 316 and provide a novel way for the second host computing device to communicate with the first host computing device and vice versa. The serial interface may be a sideband interface. MCU 305 can be configured as a USB device with a single static configuration that does not change as the first and second host computing devices are switched in and out via USB MUX 410. For instance, MCU 305 can operate as a HID device to facilitate communications over an extended HID protocol, without requiring additional non-standard drivers to be installed. Furthermore, no hub reconfiguration (e.g., changing upstream/downstream relationships) nor resets or rebooting processes are required. That is, multiple modes are not needed based on whether a first host computing device is coupled to system 400. In some aspects, MCU 305 can also operate as a firewall between SoC 316 and the first host computing device as it is limited as to what data can pass between the two devices. In system 400, the second host computing device 310 can drive display 312 without having to process graphics data from first host computing device 210, as would have to be done in configurations without USB MUX 410 and MCU 305 where the first host computing device operates as host and the second host computing device operates as a downstream device, as noted above. In system 400, first host computing device 210 can be accept standard HID commands or similar command protocols originating from second host computing device 310 (e.g., touch commands on display 312) by way of the sideband communication path provided via MCU 305, and as shown in FIG. 7. By way of example, a non-limiting list of other possible commands can include status flags (e.g., pending updates from peripherals from SoC, pending control take over by SoC with a scheduled time, PC request of SoC system to restart), error codes from SoC to PC, status/progress of updates being downloaded by SoC, PC request to SoC to take over and apply available/downloaded updates, and the like. In some aspects, SoC 316 can be configured to "spoof" any standard display 312 (e.g., touch screen) interface that a standard MCU library may be configured to communicate with. In some aspects, the communications path provided via MCU 305 may provide additional functionality (e.g., synchronization) in addition to HID commands, as would be appreciated by one of ordinary skill in the art with the benefit of this disclosure. Some additional functionality can include watchdog functions (e.g., monitor status of both hosts and reset SoC/USB link to PC as necessary), mailbox functions (e.g., expanded memory size allowing for large files to be parked on MCU via USB and picked up by the second host after switching the MUX), security functions (e.g., act as an external USB security key to the PC and working security key exchanges with SoC to form a secure link between both devices, facilitate locking one or both hosts from the peripherals if a security issue is detected by, for instance, the SoC not passing a security handshake, the MCU not allowing USB access, preventing access to a webcam feed, etc.), or the like.

According to certain embodiments, a dual-host, universal serial bus (USB) system can include a USB hub 260 including a plurality of USB ports (e.g., ports 262-266), a multiplexor 410 including a first input, a second input, and an output coupled to the USB hub. The MUX can be configured to electrically and communicatively couple the first input to the output when the MUX is switched to a first mode of operation, and the MUX can be configured to electrically and communicatively couple the second input to the output when the MUX is switched to a second mode of operation. The system can further include a host port coupled to the first input of the MUX, the host port (e.g., computer docking station) operable to receive a first host computing device (e.g., laptop, mobile computing device, etc.) and facilitate host-level control of the USB hub to the first host computing device when the MUX is in the first mode of operation. The system can further include a second host computing device coupled to the second input of the MUX, the second host computing device having host-level control of the USB hub when the MUX is in the second mode of operation. In some cases, the second host computing device may control the switching of the MUX between the first and second modes of operation. The system may include a microcontroller unit (MCU) communicatively coupled to the second host computing device and the USB hub that provides a non-USB communication path (e.g., sideband channel) from the second host computing device to the first host computing device to facilitate the sending of commands (e.g., HID commands) from the second host computing device to the first host computing device when the MUX is in the first mode of operation, as shown and described at least with respect to FIG. 7. The second host computing device may include an input/output device (e.g., touch sensitive display device) with a graphical user interface (GUI) operable to receive inputs from a user. The second host computing device may be communicatively coupled to an external computing system 395 via a cloud-based internet connection 393, the external computing system having administrative control over the operation of the system. The external computing system may also be configured to control the switching of the MUX between the first mode of operation and the second mode of operation.

USB MUX Operation

Figure 5:
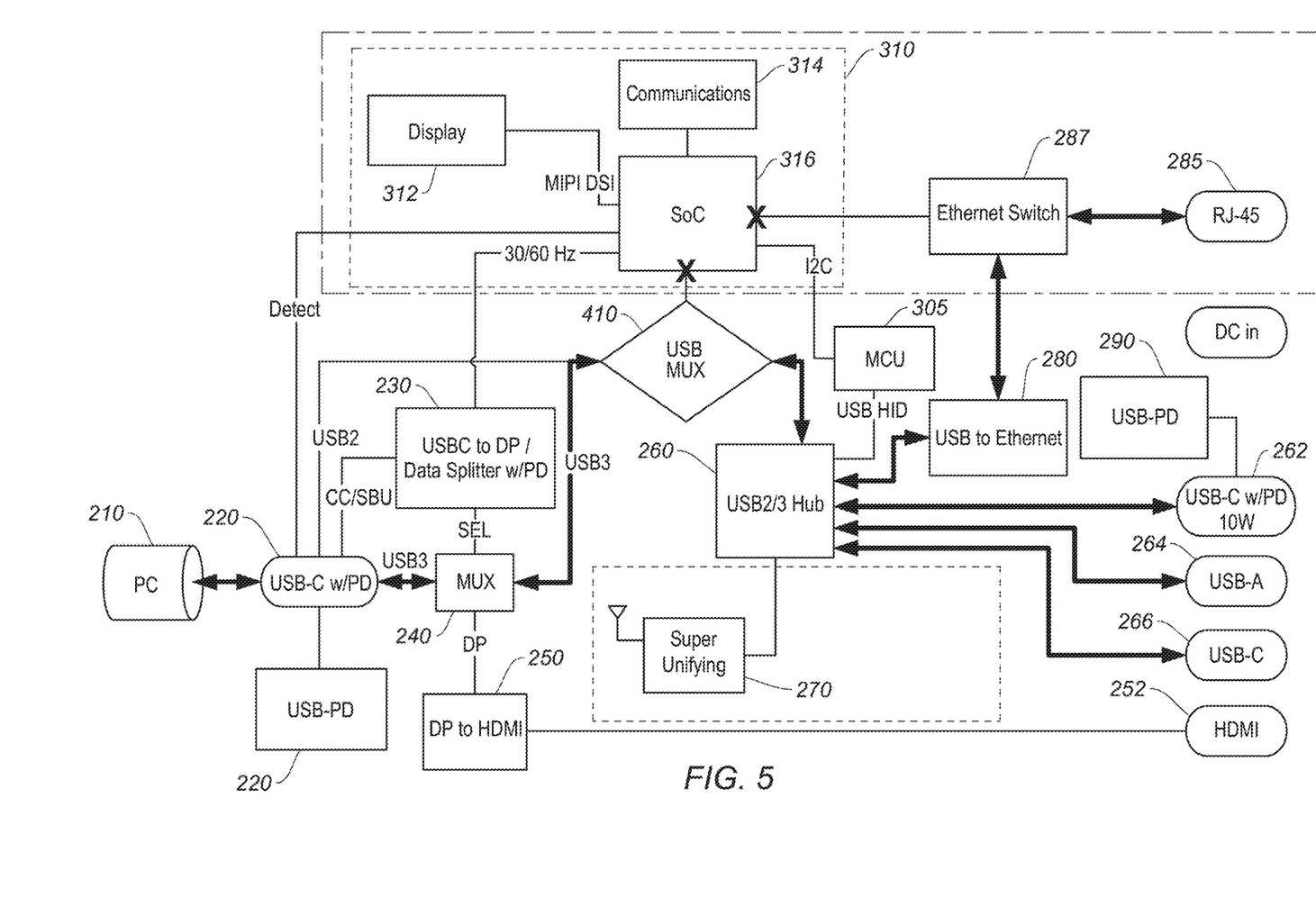
FIG. 5 shows a signal path for a docked mobile device in a USB hub and docking system with multi-host control, according to certain embodiments.
Figure 6:
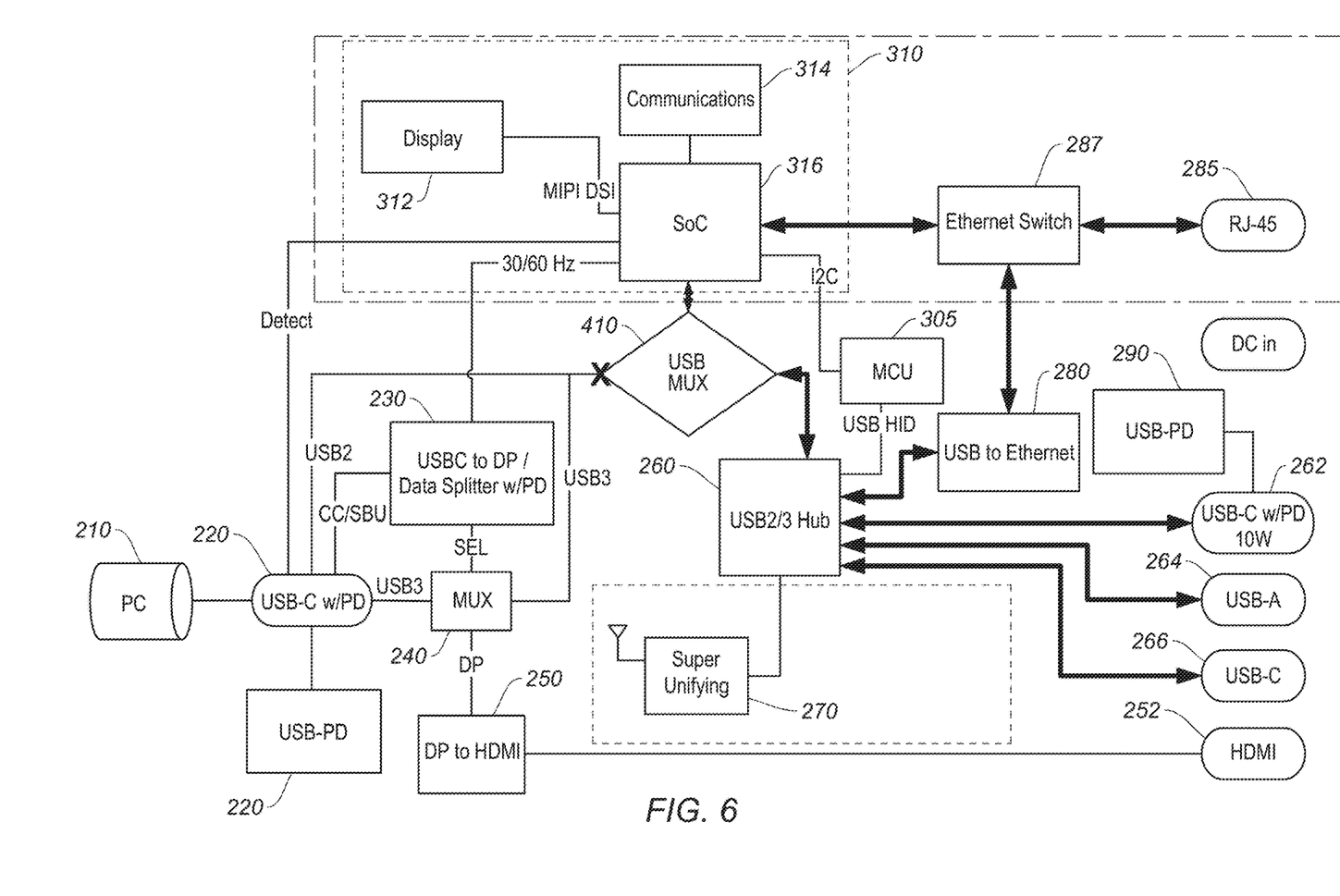
FIG. 6 shows a signal path for an administrative control device in a USB hub and docking system with multi-host control, according to certain embodiments.

FIGS. 5-7 show the various communication paths as USB MUX 410 is switched between modes of operation. Although a 2-input MUX is shown (multiplexing two host computing devices), it would be understood by one of ordinary skill in the art with the benefit of this disclosure that a 3-input, 4-input, or any number of input MUX could be used to multiplex corresponding host computing devices in the manner and spirit described throughout this disclosure.

FIG. 5 shows a signal path for a docked mobile device in a USB hub and docking system with multi-host control, according to certain embodiments. System 400 is shown in a first mode of operation where USB MUX 410 is configured to pass data to and from a first host computing device 210 (e.g., a laptop computer coupled to a docking station) communicatively coupled to the first input of USB MUX 410 to USB hub 260 and corresponding downstream USB ports (e.g., ports 262-266, ports accessible via Ethernet switch 287, etc.). USB MUX 410 may send data to and receive data from first host computing device 210 via any USB protocol including USB, USB2, USB3, etc., as shown in FIG. 5. In the first mode of operation, a second input coupled to SoC 316 is disconnected, thereby removing second host computing device 310 from the USB data stream (USB hub 260 and corresponding downstream USB ports).

FIG. 6 shows a signal path for an administrative control device in a USB hub and docking system with multi-host control, according to certain embodiments. System 400 is shown in a second mode of operation where USB MUX 410 is configured to pass data to and from a second host computing device 310 (e.g., tablet computer) communicatively coupled to the second input of USB MUX 410 to USB hub 260 and corresponding downstream USB ports (e.g., ports 262-266, ports accessible via Ethernet switch 287, etc.). In the second mode of operation, a first input communicatively coupled to first host computing device (e.g., via MUX 240, USB-C dock 215, or other intervening entity), thereby removing first host computing device 210 from the USB data stream (USB hub 260 and corresponding downstream USB ports). As described above, SoC 316 may be controlled remotely via Ethernet switch 287, for instance, by an IT personnel to configure host computer device 310 and/or polling, configuring, etc., USB devices coupled to USB hub 260. In some embodiments, second host computing device (e.g., SoC 316) may control the operation of USB MUX 410. In some aspects, commands may be received by SoC 316 from an external entity (e.g., IT personnel) to control the operation of USB MUX 410.

FIG. 7 shows a communication path between host devices in a USB hub and docking system with multi-host control, according to certain embodiments. In the configuration shown in FIG. 7, USB MUX 410 is configured such that first host computing device 210 (e.g., laptop computer) controls USB Hub 260 and second host computing device 310 (e.g., tablet computer) is decoupled from USB Hub 260. Second host computing device 310 can operate independently from USB hub 260 and corresponding USB ports. For instance, SoC 316 may control display 312 (e.g., user input and audio/video output) and communications to and from second host computing device 310 via Ethernet switch 287. In some aspects, second host computing device 310 can communicate with first host communication device 210 via MCU 305 configured as a hardwired USB slave device, which may receive commands from SoC 316 (e.g., user inputs on display 312) via a sideband path, which are translated and relayed to first host computing device as USB device commands (e.g., HID commands).

In some embodiments, the first host computing device (e.g., PC) and SoC may be configured to use a secure cloud service as a "mailbox" to quickly move large files around. In other embodiments, the SoC can be configured to directly communicate with the first host computing device (e.g., PC) via the MCU and can update the cloud service. By way of example, where the first host computing device and SoC use a cloud service as a mailbox, referred to herein as an "online" mode, the loading of a photo album is an example where a large amount of data is being passed between the PC and SoC. In an "offline" mode, a data path flow from a cloud service for large files may include the following: (1) the second host computing device is online and performed an authentication with a cloud service and is identified as a trusted and genuine device that should have access to the IT management cloud service; (2) a first host computer (e.g., laptop) is then connected and via the MCU, and is also authenticated as a genuine IT provisioned PC that has (a) been granted by IT access to this particular second host computing device, and (b) has the security clearance to access a specific user account within the cloud server, where both are typically done with an exchange of security keys involving the PC, SoC, MCU, and cloud service; (3) the second host computing device and first host computing device (e.g., PC) are now securely "bonded" together and with the cloud service—in such case the MCU may take on the burden of ensuring that the same SoC and PC are connected at all times to preserve the integrity of the link; and (4) the user can initiate a download of the photo album for slide show from either device, including (a) from the first host computing device, it can be an option that either sends a command to the MCU that points the SoC to a certain cloud service location (e.g., a specific drive on a Google® Drive) or a command directly to the cloud service to push the files onto the SoC. For example, a prompt on the SoC can display a request to a user to confirm that they had instructed the cloud service to push something onto the SoC; and (b) from the second host computing device, there may be a UX element allowing a user to also point to a location from the cloud service to download photos. The user may then confirm the action on the first host computing device, which can result in a secure confirmation from second host computing device to MCU to SoC and also from the second host computing device to the cloud service.

For an "offline" mode, the second host computing device (e.g., the SoC) may communicatively bond via the MCU to the second host computing device. There may then be a predetermined UI/UX interface loaded into the second host computing device to accept metadata from the first host computing device. For example, instead of linking a calendar, the second host computing device may have a local calendar application, and the first host computing device may transmit a collection of dates, times, etc., to the second host computing device that can be translated and displayed in the format of the preexisting calendar application. Conversely, a user may schedule an activity on the display of the second host computing device, which in turn can transmit the relevant data back to the first host computing device for processing. Thus, in typical embodiments, both "online" and "offline" modes can be used in combination where, for instance, relatively small amount of data can be directly communicated via the sideband path described above (e.g., for instances where the sideband path has a relatively low bandwidth), and relatively large amounts of data can use the cloud service route. In the direct path, the MCU manages communications and security for a relatively high security exchange, as compared to its role in the cloud service path. In some embodiments, extended HID commands may be used to attach a data payload. In some cases, a USB composite device can be enabled on the MCU such that a hardware device may appear as many different USB devices to appear, for instance, as a touchscreen, serial interface, flash drive, etc., at the same time, eliminating the need to switch modes. One of ordinary skill in the art with the benefit of this disclosure would appreciate the many modifications, variations, and alternative embodiments thereof.

Figure 8:
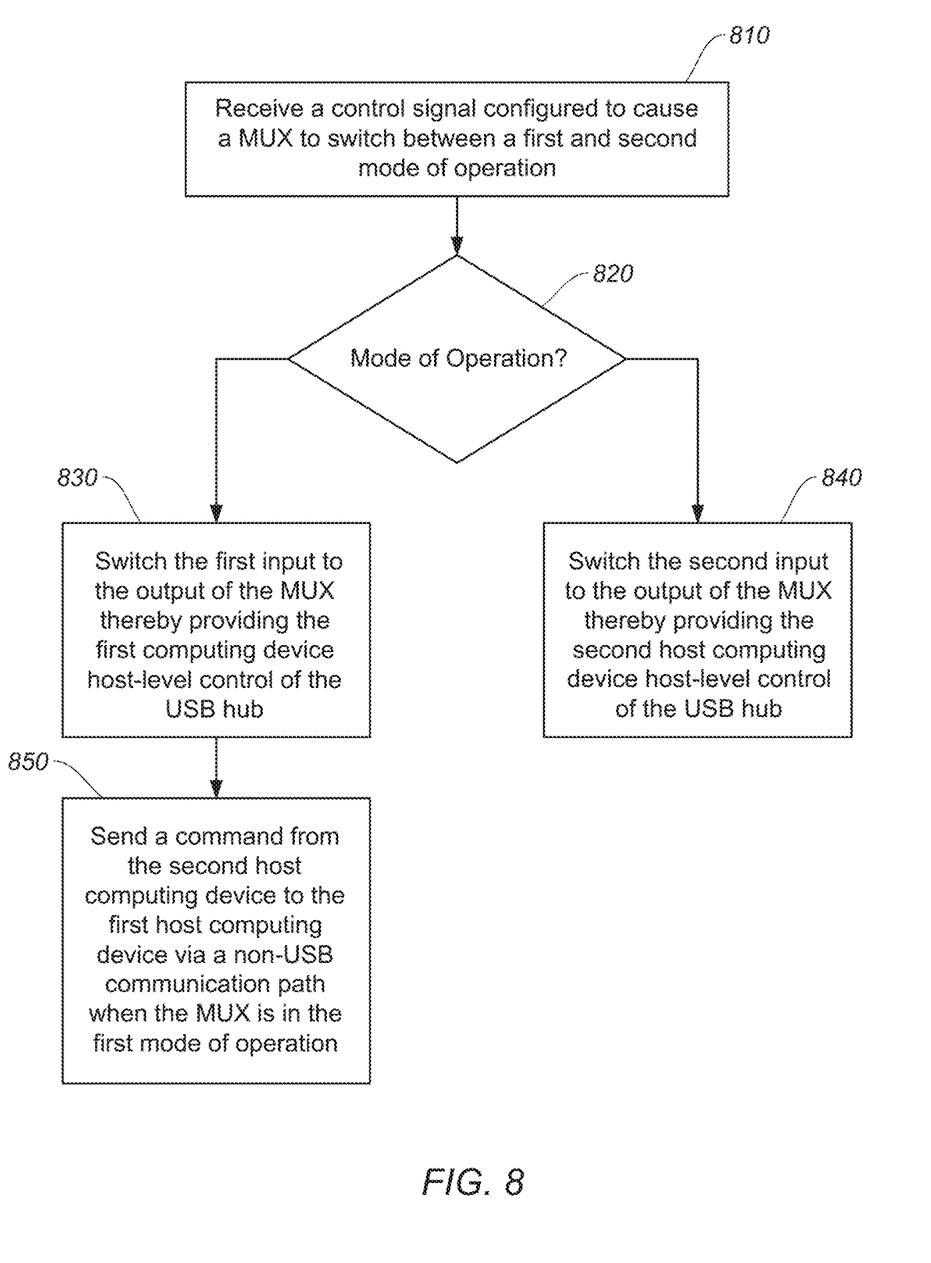
FIG. 8 is a flow chart showing a method of communication between host devices and control in a USB hub and docking system with multi-host control, according to certain embodiments.

FIG. 8 is a flow chart showing a method of communication between host devices and control in a USB hub and docking system with multi-host control, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by aspects of system 400, or elements thereof.

At operation 810, method 800 can include receiving a control signal configured to cause USB MUX 410 to switch between a first mode of operation and second mode of operation, according to certain embodiments. In some embodiments, the USB MUX includes a first input coupled to a host port that is operable to receive a first host computing device, a second input coupled to a second host computing device, and an output coupled to a USB hub having a plurality of USB ports. In some cases, the host port can be computer docking station and the first host computing device is a mobile computing device. The second host computing device can include a display device and an integrated circuit configured to control the display device, the display device having a graphical user interface (GUI) operable to receive inputs from a user, the second host computing device configured to generate the commands based on the received inputs from the user.

At operation 820, method 800 can include switching to the first or second mode of operation based on the control signal, according to certain embodiments.

At operation 830, method 800 can include switching the first input to the output of the USB MUX in response to the USB MUX being switched to the first mode of operation, wherein when in the first mode of operation the host port provides the first computing device host-level control of the USB hub, according to certain embodiments.

At operation 840, method 800 can include switching the second input to the output of the USB MUX in response to the USB MUX being switched to the second mode of operation, wherein when in the second mode of operation the second host computing device has host-level control of the USB hub, according to certain embodiments. In some aspects, the second host computing device controls the switching of the MUX between the first mode of operation and the second mode of operation.

At operation 850, method 800 can include sending a command from the second host computing device to the first host computing device via an MCU over a non-USB communication path when the MUX is in the first mode of operation, according to certain embodiments. In some aspects, the non-USB communication path can be a sideband channel, and the commands sent from the second host computing device to the first host computing device may include human interface device (HID) commands. The second host computing device may be communicatively coupled to an external computing system via a cloud-based internet connection, the external computing system having administrative control over the operation of the system. The external computing system may control the switching of the MUX between the first mode of operation and the second mode of operation.

It should be appreciated that the specific steps illustrated in FIG. 8 provide a particular method 800 for communication between host devices and control in a USB hub and docking system with multi-host control, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Thus, one of ordinary skill in the art with the benefit of this disclosure can appreciate the many uses that the embodiments described herein present. For instance, as noted above, an IT manager may remotely administer multiple workstations at once without having to physically be there and plug in a laptop into each individual station. Basically, the "tablet" (display device of the second host computing device) can be configured to poll the various USB devices and identify what they are, their status (e.g., firmware version, errors, presence etc.). This allows the IT manager to remotely update devices, debug devices, or become aware if someone removed a device such as a mouse, webcam, keyboard, etc. Additionally, the second host computing device (e.g., an Android® system) may disconnect the first host computing device (e.g., a PC connected to a docking station) and take control of the devices for maintenance reasons (e.g., when a first host computing device is left connected overnight, the second host computing device can still perform maintenance procedures and check on downstream devices). In some aspects, the IT manager can also use the display of the second host computing device to display messages such as reservations for the workstation or other status (e.g., "Out of order"). The touch sensitive display can also be used by someone to reserve the desk or log in at the desk. It should be noted that this can be a discrete interaction with the cloud service through the second host computing device with no action from the first host computing device. Finally, the touchscreen display may be configured to operate as an extended UI to the second host computing device, which is made possible via the sideband interface described above.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A dual-host, universal serial bus (USB) system comprising:
    a USB hub including a plurality of USB ports;
    a multiplexor (MUX) including:
        a first input;
        a second input; and
        an output coupled to the USB hub, wherein the MUX is configured to electrically couple the first input to the output when the MUX is switched to a first mode of operation, and the MUX is configured to electrically couple the second input to the output when the MUX is switched to a second mode of operation;
    a host port coupled to the first input of the MUX, the host port operable to receive a first host computing device, the host port providing host-level control of the USB hub to the first host computing device when the MUX is in the first mode of operation;
    a second host computing device coupled to the second input of the MUX, the second host computing device having host-level control of the USB hub when the MUX is in the second mode of operation; and
    a microcontroller unit (MCU) communicatively coupled to the second host computing device and the USB hub, the MCU providing a non-USB communication path from the second host computing device to the first host computing device to facilitate a sending of commands from the second host computing device to the first host computing device when the MUX is in the first mode of operation.

2. The system of claim 1 wherein the host port is computer docking station and the first host computing device is a mobile computing device.

3. The system of claim 1 wherein the second host computing device includes:
    a display device; and
    an integrated circuit configured to control the display device, the display device having a graphical user interface (GUI) operable to receive inputs from a user.

4. The system of claim 1 wherein the non-USB communication path is a sideband channel, and wherein the commands sent from the second host computing device to the first host computing device include human interface device (HID) commands.

5. The system of claim 1 wherein the second host computing device controls the switching of the MUX between the first mode of operation and the second mode of operation.

6. The system of claim 1 wherein the second host computing device is communicatively coupled to an external computing system via a cloud-based internet connection, the external computing system having administrative control over the operation of the system.

7. The system of claim 6 wherein the external computing system controls the switching of the MUX between the first mode of operation and the second mode of operation.

8. A method for operating a dual-host USB system, the method comprising:
receiving a control signal configured to cause a multiplexor (MUX) to switch between a first mode of operation and second mode of operation, the MUX including:
a first input coupled to a host port that is operable to receive a first host computing device;
a second input coupled to a second host computing device; and
an output coupled to a USB hub having a plurality of USB ports;
switching the first input to the output of the MUX in response to the MUX being switched to the first mode of operation, wherein when in the first mode of operation the host port provides the first computing device host-level control of the USB hub;
switching the second input to the output of the MUX in response to the MUX being switched to the second mode of operation, wherein when in the second mode of operation the second host computing device has host-level control of the USB hub; and
sending a command from the second host computing device to the first host computing device via an MCU over a non-USB communication path when the MUX is in the first mode of operation.

9. The method of claim 8 wherein the host port is computer docking station and the first host computing device is a mobile computing device.

10. The method of claim 8 wherein the second host computing device includes:
a display device; and
an integrated circuit configured to control the display device, the display device having a graphical user interface (GUI) operable to receive inputs from a user, the second host computing device configured to generate the commands based on the received inputs from the user.

11. The method of claim 8 wherein the non-USB communication path is a sideband channel, and wherein the commands sent from the second host computing device to the first host computing device include human interface device (HID) commands.

12. The method of claim 8 wherein the second host computing device controls the switching of the MUX between the first mode of operation and the second mode of operation.

13. The method of claim 8 wherein the second host computing device is communicatively coupled to an external computing system via a cloud-based internet connection, the external computing system having administrative control over the operation of the system.

14. The method of claim 13 wherein the external computing system controls the switching of the MUX between the first mode of operation and the second mode of operation.

15. A system comprising:
one or more processors;
one or more machine-readable, non-transitory storage mediums that include instructions configured to cause the one or more processors to perform operations including:
receiving a control signal configured to cause a multiplexor (MUX) to switch between a first mode of operation and second mode of operation, the MUX including:
a first input coupled to a host port that is operable to receive a first host computing device;
a second input coupled to a second host computing device; and
an output coupled to a USB hub having a plurality of USB ports;
switching the first input to the output of the MUX in response to the MUX being switched to the first mode of operation, wherein when in the first mode of operation the host port provides the first computing device host-level control of the USB hub;
switching the second input to the output of the MUX in response to the MUX being switched to the second mode of operation, wherein when in the second mode of operation the second host computing device has host-level control of the USB hub; and
sending a command from the second host computing device to the first host computing device via an MCU over a non-USB communication path when the MUX is in the first mode of operation.

16. The system of claim 15 wherein the host port is computer docking station and the first host computing device is a mobile computing device.

17. The system of claim 15 wherein the second host computing device includes:
a display device; and
an integrated circuit configured to control the display device, the display device having a graphical user interface (GUI) operable to receive inputs from a user, the second host computing device configured to generate the commands based on the received inputs from the user.

18. The system of claim 15 wherein the non-USB communication path is a sideband channel, and wherein the commands sent from the second host computing device to the first host computing device include human interface device (HID) commands.

19. The system of claim 15 wherein the second host computing device controls the switching of the MUX between the first mode of operation and the second mode of operation.

20. The system of claim 15 wherein the second host computing device is communicatively coupled to an external computing system via a cloud-based internet connection, the external computing system having administrative control over the operation of the system.

* * * * *